United States Patent Office 2,934,054
Patented Apr. 26, 1960

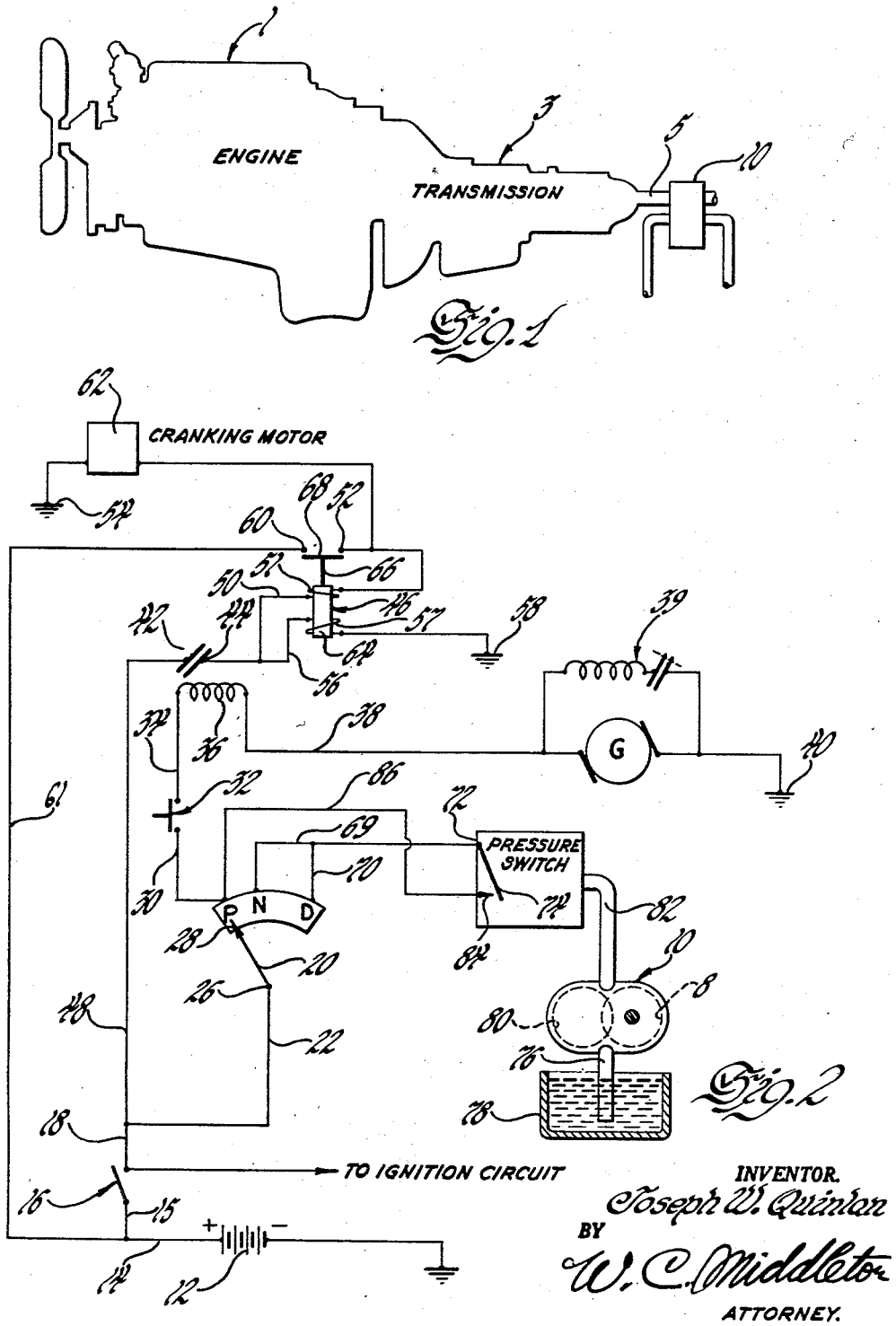

2,934,054

ENGINE STARTING CONTROL SYSTEM

Joseph W. Quinlan, Flint, Mich., assignor to General Motors Corporation, Detroit, Mich., a corporation of Delaware Application November 15, 1956, Serial No. 622,391

1 Claim. (Cl. 123—179)

This invention relates to an electrically controlled engine starting system for use on motor vehicles equipped with transmissions having driven shaft oil pumps.

Many present day motor vehicles are now equipped with automatic transmissions having driven shaft oil pumps developing a pressure that varies with motor vehicle speed. The transmissions automatically vary the speed ratio from zero to approximately engine speed according to the position of a manually controlled selector member or lever operable by the vehicle driver. The plurality of positions of this member usually includes (1) a "Park" or "Lock" position causing the output shaft of the transmission to be locked so as to prevent movement of the vehicle; (2) a "Neutral" position, in which the drive from the engine to the wheels of the vehicle is broken; (3) a "Drive" position, in which the vehicle may be accelerated from a position of rest through either an infinite number of gear ratios or a predetermined number of stepped gear ratios to approximately engine speed; and (4) a "Reverse" position wherein the transmission is conditioned to turn the output shaft in a direction opposite to that of the direction of rotation of the engine. Due to various uncontrollable conditions, the engine may sometimes fail either while the vehicle is in motion or while the vehicle is stopped, but at a time when the vehicle driver does not desire it to do so. In the past, the practice has sometimes been to provide an engine starting system of such a nature that when the manual selector member is moved to position the transmission for either "Park" or "Neutral," the starting system would be conditioned for operation. In those transmissions where this system is employed, unforeseen developments sometimes arise making it undesirable to have the starting system conditioned for operation in this manner. One of these conditions may be, that due to the viscose nature of the fluid in the transmission, the drive from the engine to the output shaft may not be interrupted even though the transmission is conditioned for "Neutral." Under such a condition, starting of the engine would cause a lurch or movement of the vehicle, which is undesirable.

Therefore, this invention relates to an electrically controlled starting system wherein; with the vehicle at rest, the engine may be conditioned for starting only by placing the transmission selector lever in the "Park" position, whereas; with the vehicle in motion, the engine may be conditioned for starting only if the transmission selector lever is placed in either "Neutral" or "Drive" position.

It is therefore an object of this invention to provide a vehicle engine starting system that is conditioned for operation with the vehicle at rest by positioning a manually operable member in one position only.

It is a further object of this invention to provide a vehicle engine starting system that is conditioned for operation with the vehicle in motion by positioning a manually operable member in a plurality of selected positions.

It is another object of this invention to provide, in a motor vehicle equipped with an automatic transmission, an engine starting system that may be conditioned for operation with the vehicle in motion by placing the transmission selector lever in "Neutral" or "Drive" positions, and may be conditioned for operation with the vehicle at rest only by positioning the lever in the "Park" position.

Furthermore, it is an object of this invention to provide a motor vehicle engine starting system that is simple in design and operation, is easily serviceable, convenient to use, and one that is coordinated with the operation of the transmission.

Other features, advantages and objects will become apparent by reference to the detailed description of the invention and to the drawings, wherein;

Figure 1 is a schematic illustration of an engine and transmission that could be used to practice this invention; and Figure 2 is a diagrammatical illustration of the electrical circuit embodying this invention.

Referring now to the drawings, and more particularly to Figure 1, a schematic illustration of an engine that could be used to practice this invention is shown at 1, driving a transmission 3 preferably of the automatic type provided with an output shaft 5 adatped to drive the driving gear 8 (Fig. 2) of a gear type oil pump 10.

Referring now to Figure 2, a storage battery 12 is shown connected in series with a conventional ignition switch 16 by means of leads 14 and 15. This ignition switch 16 is shown in an open position, and is adapted to be closed in the normal manner to connect lead 18 with the battery by any suitable means, such as the standard ignition key. Lead 18 is adapted to be connected by means of lead 22 with a selector lever contact 28 formed on the lever 20 controlling the automatic transmission 3.

Selector lever 20 is pivoted at 26 by means of suitable mechanism (not shown), and its contact member 28 is adapted to selectively connect the battery with a plurality of circuits by means of contacts indicated at P, N, and D, corresponding to the "Park," "Neutral," and "Drive" positions indicated on the conventional transmission selector lever indicating plate. While only three particular transmission controlling conditions are shown in the figures, it will be obvious that more could be shown without departing from the scope of the invention. The contact P connects the battery to a generator G by means of a lead 30, a push button starter switch mechanism indicated schematically at 32, lead 34, a solenoid starter relay 36, and lead 38. The generator has the conventional field windings with its associated regulator contacts indicated at 39, and is connected to ground at 40. The solenoid starter relay 36 is adapted to connect a set of contact members 42 and 44 controlling the energization of a conventional engine starting mechanism by means of a solenoid operating mechanism 46. Contact 42 is connected to the battery by means of a lead 48 placed in parallel to the circuit through the selector lever to the generator. The other contact 44 of the solenoid relay contacts has two leads 50 and 56 in parallel, the lead 50 being connected to a "pull-in" winding 51 of the solenoid and through this to a main contact 52 which extends to starting motor 62, while the other lead 56 is connected to a "hold-in" winding 57 of the solenoid, and through this to ground at some convenient point 58. The other main contact 60 is connected directly to the battery by means of conductors 61 and 14. Main contact 52 is connected to ground at 54 through a conventional cranking or starting motor illustrated by the block 62. The solenoid 64 has a plunger 66 with a contact bar 68 thereon adapted to bridge the gap between the main contacts 52 and 60. Upon energization of the solenoid, the solenoid plunger first moves suitable mechanism (not shown) to engage the flywheel of the engine and then closes the main contacts, thereby energizing the cranking motor to start the engine. At the same time, closure of the main contacts 52 and 60 will cut out the "pull-in" winding 51 of the solenoid because of the connection across the main contacts. The "hold-in" winding 57 is sufficient to keep the main contacts 52 and 60 closed at this time. Once the engine is operating, the main contacts 52 and 60 will be opened and the circuit broken only by opening the starter relay contacts 42 and 44. These contacts may be opened by one of two methods.

The starter switch mechanism 32 is shown as being of the push button type and is released to an open position by a spring bias (not shown). Upon release of the starter switch, the circuit will be broken to the generator, thereby releasing or opening the starter relay contacts 42 and 44 and de-energizing the "hold-in" winding 57 to permit withdrawal of the solenoid plunger 66 thereby opening the main contact switch 52 and 60. The starter motor 62 will then be de-energized. While the starter mechanism is shown as being of a push button type, other forms of starter switches could be used without departing from the scope of the invention. If it is desired to use an automatically releasable type of starter mechanism, the starter relay contacts 42 and 44 would be opened upon sufficient voltage being developed by the generator G by rotation by the engine to oppose the voltage supplied by the battery 12, thereby de-energizing the "hold-in" winding 57 and opening the main contacts 52 and 60 to de-energize the cranking motor.

While only one circuit has been described connecting the battery and the cranking motor, the selector lever 20 may be moved to a plurality of other positions, indicated at N and D. N and D positions are connected by means of leads 69 and 70, respectively, to one contact 72 of a fluid pressure actuated switch member 74 adapted to be actuated to a closed position by means of pressure from the pump 10. The other contact 84 is connected to contact P by means of a lead 86 to complete the circuit from the battery when the pressure actuated switch is closed. The pump 10, while shown as being of the gear type, may be any conventional hydraulic type pump well-known in the art, and consists of the usual intake suction pipe 76 connected with a sump 78, driving gear 8, driven gear 80, and delivery pipe 82 leading to switch member 74. The switch member 74 is normally biased to an open position by a spring (not shown) and is adapted to be closed by pressure supplied by this pump. In automatic transmissions, an engine driven pump and a driven shaft pump may be used to provide and supply the necessary hydraulic pressure to actuate fluid pressure actuated mechanisms to establish the different gear ratios. The driven shaft pump is connected to the output shaft and develops pressure upon rotation of the output shaft. Therefore, the pump shown schematically in Figures 1 and 2 is preferably adapted to be driven by the output shaft of the transmission as shown at 5 in Figure 1 to operate pressure switch 74 as soon as the pressure reaches a predetermined value.

The operation of this device is as follows: With the vehicle at rest and the engine dead, driven shaft pump 10 is inoperative and switch 74 is open. Since the pressure switch is in series in the circuit between the cranking motor and the neutral and drive positions of the selector lever, if the manual selector lever should be placed in either of these positions at this time, no circuit could be established. However, by moving the manual selector lever member 20 to the P position, the hydraulic pressure actuated switch is shunted or by-passed, thereby conditioning the engine starting system for operation. Upon closure of the conventional key ignition switch 16, and the start switch 32, current will be fed from the storage battery 12 to the ground at 40 through the generator G by means of leads 14 and 15, ignition switch 16, conductors 18 and 22, manual selector lever contact 28, contact P, lead 30, starter switch 32, lead 34, relay 36 and lead 38. Upon energization of the starter relay 36, the starter contacts 42 and 44 will be closed, thereby closing the circuit between the battery and the solenoid "pull-in" and "hold-in" windings 51 and 57, respectively. Both windings 51 and 57, when energized in this manner, produce a magnetic field which moves the solenoid plunger 66 so that the drive pinion of the cranking motor is shifted into mesh with the flywheel of the engine and the main contacts 52 and 60 in the solenoid switch are closed to connect the battery directly to the cranking motor to start the engine. Closure of the main contacts cuts out the "pull-in" winding 51; however, the "hold-in" winding 57 of the solenoid is sufficient at this time to keep the plunger bridged across the main contacts.

Considering now the condition when the engine fails with the vehicle in motion, driven shaft pump 10 will have been activated to supply fluid from the sump 78 to close the pressure actuated switch 74 at some predetermined vehicle speed. With this switch actuated, placing the manual selector lever in the neutral or drive positions will condition the starting circuit for operation upon closure of the starter switch. This is accomplished because of the completion of the circuit from the battery to ground through leads 14 and 15, the ignition switch 16, leads 18 and 22, manual selector lever contact 28, contacts N or D, leads 69 or 70, closed switch 74, lead 86, contact P, starter switch 32, relay 36, lead 38 and generator G. As before, the battery will energize the starter relay coils to energize the solenoid thereby operating the cranking motor. Because of the leads 69 and 70 connecting the Neutral and Drive contacts, the starting system can be activated with the selector lever in either position, as long as the vehicle is in motion to permit closing of the pressure switch. While contacts N and D are shown as being connected to the same circuit by leads 69 and 70, it will be obvious that lead 70 could be eliminated without departing from the scope of the invention, thereby making it necessary, with the vehicle in motion, that the selector lever be positioned in the "Neutral" position before the starting system can be conditioned for operation. To prevent damage to the transmission while the vehicle is in motion, the manual selector lever can be prevented from being placed in the P position by some suitable mechanism (not shown).

From the foregoing it is seen that applicant has provided an efficient and safe engine starting system, that protects the transmission from damage, and avoids unnecessary discomforts to the driver. It permits starting of a dead engine with the vehicle at rest, only by positioning the selector lever in the "Park" position, and with the vehicle in motion, only by placing the selector lever in the "Neutral" or "Drive" positions. It will be understood that the invention can be modified beyond the illustrated embodiments, and, therefore, any limitations to be imposed are those set forth in the following claim.

I claim:

In a motor vehicle having an engine and an hydraulically operated transmission including an output shaft; an engine starting system comprising an electrically operated starting motor; a source of electrical energy; a starter motor control circuit including said starting motor and said source; a transmission selector lever movable to condition said hydraulic transmission in neutral, drive and park conditions; said transmission selector lever being connected with said starter motor control circuit so that said circuit is closed when said selector lever is placed in said park position and is normally opened when said selector lever is placed in said neutral and drive positions; a normally open fluid pressure operated switch; said switch being connected with said starter motor control circuit to close said circuit when supplied with a predetermined fluid pressure; and a fluid pump; said fluid pump driven by said transmission output shaft and providing fluid pressure to said fluid pressure switch; said fluid pressure switch being actuated to a closed position by said pump fluid pressure and completing said starting motor control circuit while said transmission selector lever is in neutral and drive positions thereby allowing the vehicle engine to be restarted during an engine stall while the vehicle is in motion.

References Cited in the file of this patent

UNITED STATES PATENTS

| | | |
|---|---|---|
| 2,606,456 | Dodge | Aug. 12, 1952 |
| 2,685,650 | Collins et al. | Aug. 3, 1954 |
| 2,803,236 | Tamburello | Aug. 17, 1955 |